US010391737B2

(12) United States Patent
Calomino et al.

(10) Patent No.: US 10,391,737 B2
(45) Date of Patent: Aug. 27, 2019

(54) LIGHTWEIGHT FLEXIBLE THERMAL PROTECTION SYSTEM FOR FIRE PROTECTION

(71) Applicant: U.S.A. as represented by the Administrator of the National Aeronautics and Space Administration, Washington, DC (US)

(72) Inventors: Anthony M. Calomino, Cleveland, OH (US); Mary Elizabeth Wusk, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 77 days.

(21) Appl. No.: 14/516,951

(22) Filed: Oct. 17, 2014

(65) Prior Publication Data

US 2016/0107412 A1 Apr. 21, 2016

(51) Int. Cl.
*B32B 7/12* (2006.01)
*B32B 5/02* (2006.01)
(Continued)

(52) U.S. Cl.
CPC ................ *B32B 5/024* (2013.01); *B32B 5/02* (2013.01); *B32B 5/026* (2013.01); *B32B 5/06* (2013.01); *B32B 5/22* (2013.01); *B32B 5/24* (2013.01); *B32B 5/26* (2013.01); *B32B 7/12* (2013.01); *B32B 15/04* (2013.01); *B32B 27/06* (2013.01); *B32B 7/08* (2013.01); *B32B 2255/10* (2013.01); *B32B 2255/205* (2013.01);
(Continued)

(58) Field of Classification Search
CPC ... B32B 2307/3065; B32B 5/02; B32B 5/024; B32B 5/026; B32B 5/06; B32B 7/08; B32B 7/12
USPC .................................................. 428/212, 220
See application file for complete search history.

(56) References Cited

U.S. PATENT DOCUMENTS 4,509,559 A * 4/1985 Cheetham ................ E04B 1/94 138/121
6,881,506 B2 4/2005 Anderson et al.
(Continued)

OTHER PUBLICATIONS

Interagency Fire Shelter Task Group, "Wildland Fire Shelter," 45 pages, catalog Sep. 25, 2008 at http://www.fs.fed.us/t-d/programs/fire/documents/shelhist.pdf.

*Primary Examiner* — Lawrence D Ferguson
(74) *Attorney, Agent, or Firm* — Andrea Z. Warmbier; Robin W. Edwards; Mark P. Dvorscak

(57) ABSTRACT

A portable thermal protection system is provided for protecting equipment, facilities, and personnel in a region from a high intensity incident heat source. The system can be formed as a sleeping bag, a tent, a blanket, a sleeping bag, a vertical barrier, a curtain, a flexible rollup doorway, or a wrap. The system includes an outer textile layer first layer, an insulative material(s) second layer, and a non-porous film third layer which forms a gas barrier. Some embodiments include a fourth layer formed of a material to provide radiation protection. In some embodiments, the first and/or second layers are integrally formed with the materials that reflects radiation. The layers are joined together by high-temperature adhesives, stitching, needling, or tacking.

19 Claims, 3 Drawing Sheets

(51) Int. Cl.

| | |
|---|---|
| ***B32B 5/06*** | (2006.01) |
| ***B32B 5/22*** | (2006.01) |
| ***B32B 5/24*** | (2006.01) |
| ***B32B 5/26*** | (2006.01) |
| ***B32B 15/04*** | (2006.01) |
| ***B32B 27/06*** | (2006.01) |
| *B32B 7/08* | (2019.01) |

(52) U.S. Cl.
CPC ... *B32B 2262/101* (2013.01); *B32B 2262/105* (2013.01); *B32B 2262/106* (2013.01); *B32B 2307/304* (2013.01); *B32B 2307/3065* (2013.01); *B32B 2307/416* (2013.01); *B32B 2307/546* (2013.01); *B32B 2307/718* (2013.01); *B32B 2307/7242* (2013.01); *B32B 2571/00* (2013.01)

(56) References Cited

U.S. PATENT DOCUMENTS

| | | | | |
|---|---|---|---|---|
| 7,084,083 | B2 | 8/2006 | Anderson et al. | |
| 7,128,207 | B2 | 10/2006 | Anderson et al. | |
| 2009/0110919 | A1 * | 4/2009 | Panse ................. | A41D 31/0027 428/339 |
| 2009/0188539 | A1 * | 7/2009 | Hollinger ................ | E04H 15/22 135/115 |
| 2012/0174748 | A1 * | 7/2012 | Landi ........................ | F41H 1/02 89/36.02 |

* cited by examiner

LIGHTWEIGHT FLEXIBLE THERMAL PROTECTION SYSTEM FOR FIRE PROTECTION

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to a lightweight flexible thermal protection system for protecting equipment, facilities, and personnel in a region from a high intensity heat source.

BACKGROUND OF THE INVENTION

Combatting fires is an inherently dangerous effort. Firefighters working within a building or on the ground are routinely exposed to unpredictable, dynamic, and life threatening conditions. A particularly alarming situation can arise when rapidly changing or aggressive conditions result in the loss of an escape route. In an entrapment situation, personnel are caught by the dynamics of an advancing fire, and it is likely that their only chance of survival is the use of an emergency fire shelter. Emergency fire shelters were developed starting in the late 1950's as a last resort one person tent, which is designed primarily to reflect thermal radiation and trap breathable air. Several alterations to the original design have been made over the years, including a major retrofit in 2001.

The fire shelter currently in use by the United States Forest Service is called the M2002. The M2002 performs very well as a reflector of thermal radiation. FIG. 1 illustrates the design of the existing M2002 fire tent. The current M2002 is designed like a tent so the shelter walls are not in direct contact with the firefighter inside.

A lightweight flexible thermal protection system is provided herein which presents improvements to existing thermal protection system state of art. Other features and advantages will become apparent upon a reading of the attached specification, in combination with a study of the drawings.

SUMMARY OF THE INVENTION

A portable, lightweight, flexible thermal protection system is provided for protecting equipment, facilities and personnel in a region from a high intensity incident heat source. The system can be formed as a sleeping bag, a tent, a blanket, a vertical barrier, a curtain, a flexible rollup doorway, or a wrap. The system has a first layer formed from an outer textile layer, a second layer formed from insulator material or materials, and a third layer formed from a non-porous film which forms a gas barrier. Some embodiments of the system include a fourth layer formed of a material to provide radiation protection. In some embodiments, the first and/or second layers are integrally formed with the materials that reflect radiation. The layers are joined together by high-temperature adhesives, stitching, needling, or tacking.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
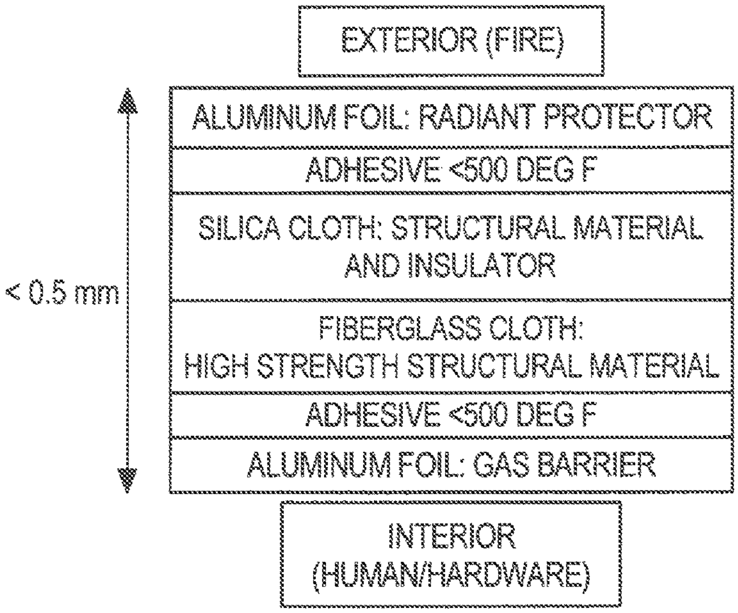
FIG. 1 is a diagram showing the components of a prior art fire shelter currently in use by the United States Forest Service called the M2002.
Figure 2:
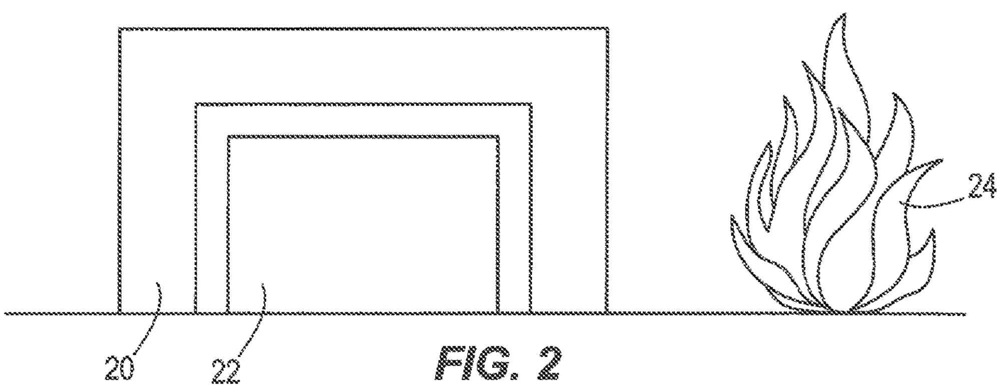
FIGS. 2 and 3 are diagrams of a portable, lightweight, flexible thermal protection system which incorporates the features of the present invention, and being shown in use.
Figure 3:
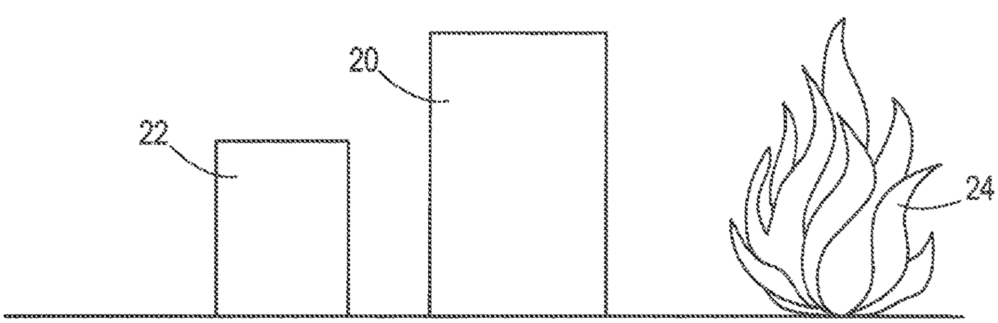

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional variants that were otherwise not shown for purposes of brevity.

A lightweight flexible thermal protection system 20 is provided which temporarily provides a region 22 protected against a high intensity incident heat source 24 that can have both a convective and radiant component. The thermal protection system 20 may be used to cover the region 22, or provide a barrier between the region 22 and the high intensity incident heat source 24. The thermal protection system 20 serves as a temporary heat barrier that separates and protects the region 22 from the high intensity incident heat source 24. The thermal protection system 20 may be in direct contact with personnel, equipment, or facilities within the region 22, or may be spaced from personnel, equipment, or facilities within the region 22. The thermal protection system 20 may be used in any instance where fire protection is needed, such as for example, by forest and wild land fire fighters, by fire fighters in a building, to separate rooms in a building, in an aircraft, or surrounding aircraft components. The thermal protection system 20 is flexible so that it can be wrapped around components in the region 22, such as an aircraft nacelle. For the uses where the thermal protection system 20 is portable, the thermal protection system 20 is flexible and compressible and/or foldable so that the thermal protection system 20 can be compacted into a small volume to facilitate easy transport and personal portability. The thermal protection system 20 uses lightweight and flexible layers 26, 28, 30 which meet strict packing volume and weight limits, while providing protection from convective heat flux and temperatures. The thermal protection system 20 is resistant to direct flame, high temperatures, and hot, high-velocity gas.

Figure 4:
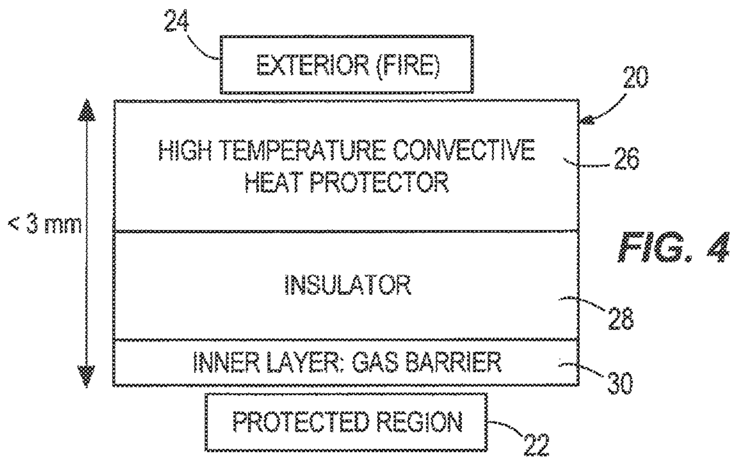
FIG. 4 is a diagram showing the components of the portable, lightweight, flexible thermal protection system of FIGS. 2 and 3.
Figure 5:
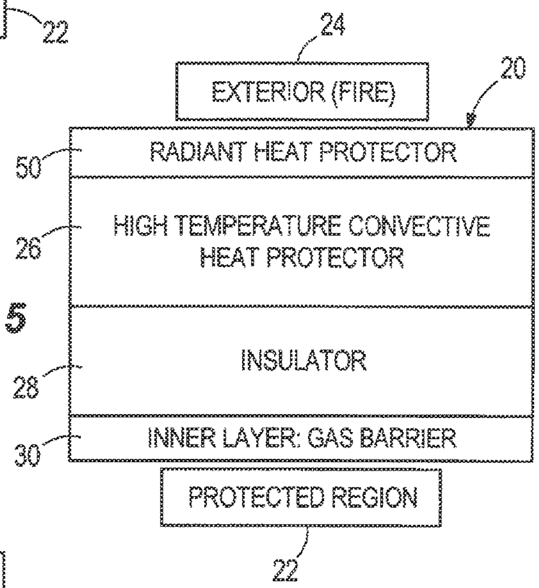
FIG. 5 is a diagram showing the components of the portable, lightweight, flexible thermal protection system according to a first alternate embodiment.
Figure 6:
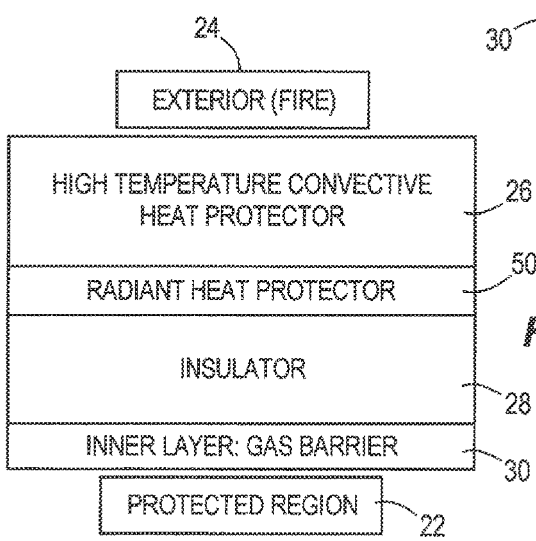
FIG. 6 is a diagram showing the components of the portable, lightweight, flexible thermal protection system according to a second alternate embodiment.

As shown in FIG. 4, the thermal protection system 20 is formed of flexible first, second and third layers 26, 28, 30 which are joined together, namely: first layer 26 formed of flexible refractory textile in the form of a high temperature convective heat protector, second layer 28 formed of a thin film insulator material or materials, and third layer 30 formed of a gas barrier. As shown in FIGS. 5 and 6, a fourth flexible layer 50 may be incorporated to provide radiation protection. The thermal protection system 20 handles external temperatures of up to 3000 degrees F. for a duration of up to ten minutes.

As shown in FIG. 4, the first layer 26 is directly exposed to the intense heat of the high intensity incident heat source 24. The second layer 28 is between the first layer 26 and the third layer 30. The third layer 30 is proximate to the region 22. The region 22 is positioned under, in, or proximate to the thermal protection system 20. The thermal protection system 20 provides passive thermal protection through the layered use of the first, second and third layers 26, 28, 30. The first, second and third layers 26, 28, 30 impede the absorption and transfer of heat through its thickness. The first, second and third layers 26, 28, 30 are joined together by suitable means which extend the temperature capability of the thermal protection system 20 to be compatible with high-convective heat transfer loads, such as for example, but not limited to, high-temperature adhesives, high-temperature stitching, high-temperature needling, or high-temperature tacking.

The first layer 26 is formed from a porous outer textile layer. The first layer 26 is formed by weaving, braiding or knitting together refractory ceramic, graphite or glass fibers, tows, or yarns. The first layer 26 primarily provides handling and mechanical durability to the thermal protection system 20 when packed, deployed, and placed into service. The first layer 26 provides the first resistance to heat absorption through reduced solid conductivity, heat rejecting phase transformation materials, or enhanced radiation reflectance materials or coatings. The first layer 26 reflects most of the radiant thermal energy similar to M2002 fire shelter currently in use by the United States Forest Service.

The second layer 28 is composed of a single layer or multiple layers of thin materials that manage thermal transfer of heat through the thermal protection system 20. The second layer 28 is highly efficient at reducing conductive heat transfer. The second layer 28 minimizes the absorbed heat of the overall thermal protection system 20 through impedance of radiation, gas convection, and solid conduction. Examples of materials that imped gas convection can include both organic and inorganic aerogel films (such as those disclosed in U.S. patent application Ser. Nos. 12/571,049; 13/756,855; 14/168,830 which disclosures are incorporated by reference in their entireties), films that manage heat absorption through decomposition or phase transformation, low conductivity fibrous felts and papers constructed of glass, ceramics, graphite, cellulous, or organic materials that char or sublime. The second layer 28 may also employ "active" insulating materials that may degrade and provide a transpiration cooling effect from pyrolysis gases released during the decomposition process or may employ intumescent materials that "swell-up" when heated providing additional thermal conductive heat transfer resistance.

Figure 7:
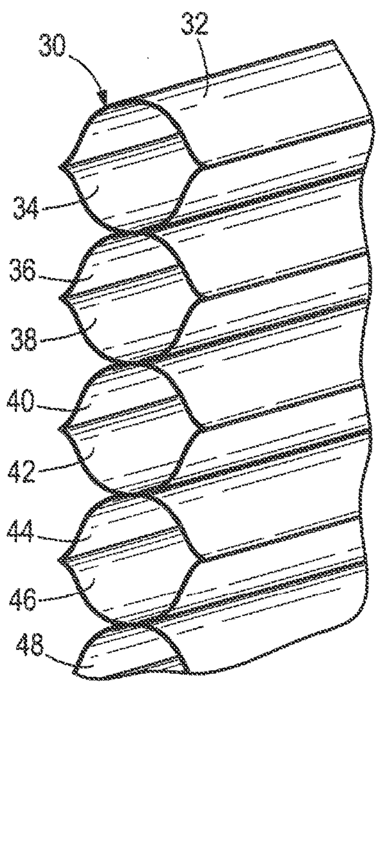
FIG. 7 is a partial perspective view of an insulator material used in the portable, lightweight, flexible thermal protection system.

The third layer 30 forms an inner liner and is proximate to the region 22. The third layer 30 is a non-porous film that serves as a gas barrier layer to prevent the entrance of hot gas and/or decomposing gases into the region 22. The third layer 30 keeps hot gas away from the region 22 and can be used to trap breathable air inside the thermal protection system 20. The third layer 30 also provides additional insulation against heat transfer to the region 22 by using multiple joined films 32-48 et seq. that form inflatable insulator cells as shown in FIG. 7.

The thermal protection system 20 is highly resistance to direct flame, high temperatures, and hot, high-velocity gas by providing an effective thermal conduction barrier.

The thermal protection system 20 preferably has a thickness of less than 3 mm when the thermal protection system 20 is in a deployed condition (in use). When packed into a portable condition, the second layer 28 may be compressed by vacuum-bagging or other compression technique to reduce the overall thickness of the thermal protection system 20 in a non-deployed condition (for stowage and transportation by a vehicle, person or animal).

An alternate embodiment of the thermal protection system 20 is shown in FIG. 5 and which includes the fourth layer 50. The fourth layer 50 may be any material which provides radiation protection. For example, the fourth layer 50 may be formed of thin polymeric films with metallic or optically reflective coatings, fibrous felts or mats modified with opacified particulates or photonic deflectors. The fourth layer 50 may be thin metal coating on the exterior surface of the first layer 26, or may be a separate thin metal layer attached to the first layer 26.

Another alternate embodiment of the thermal protection system 20 is shown in FIG. 6 and which includes the fourth layer 50. The fourth layer 50 may be any material which provides radiation protection. For example, the fourth layer 50 may be formed of thin polymeric films with metallic or optically reflective coatings, fibrous felts or mats modified with opacified particulates or photonic deflectors. In this embodiment, the fourth layer 50 is formed of a separate layer between the first layer 26 and the second layer 28.

Alternatively, the materials comprising the fourth layer 50 may be integrated into the first layer 26 or may be integrated into the second layer 28. As such, the radiation protection features of the fourth layer 50 are provided by the first layer 26 or the second layer 28.

Figure 8:
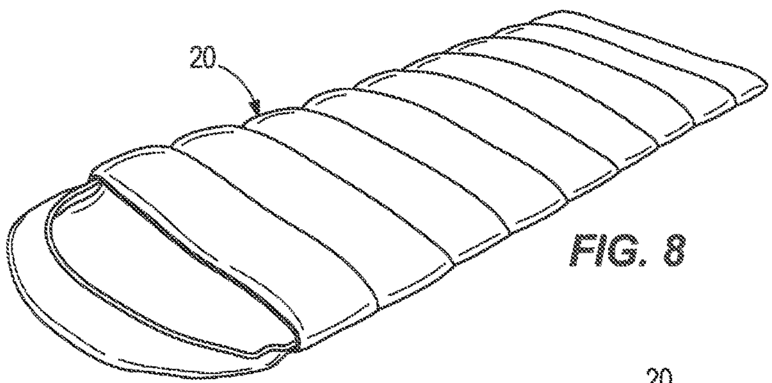
FIG. 8 shows a sleeping bag which may form the portable, lightweight, flexible thermal protection system.
Figure 9:
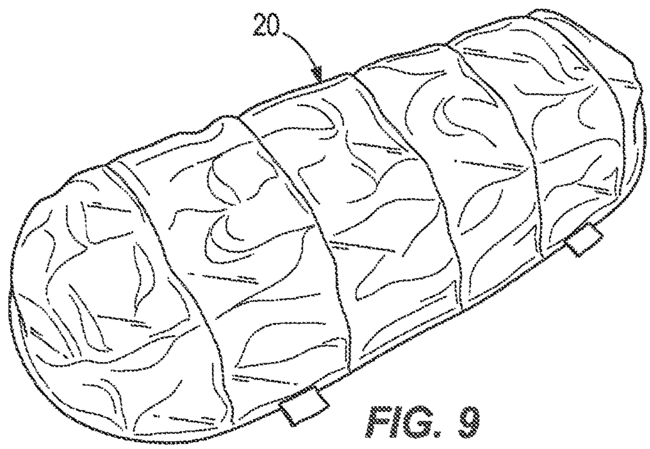
FIG. 9 shows a tent which may form the portable, lightweight, flexible thermal protection system.

The thermal protection system 20 may take a variety of forms, such as a sleeping bag, a tent, a blanket, a vertical barrier, a curtain, a flexible rollup doorway, a wrap which wraps around a component to be protected, such as a nacelle of an aircraft, etc. A sleeping bag is shown in FIG. 8 and a tent is shown in FIG. 9 as examples of the thermal protection system 20. The tent has a wall formed from the thermal protection system 20, and which may include other layers (not shown), which contacts the ground and surrounds the region 22 in which the personnel, equipment, or facilities are located. The wall may or may not be in direct contact with the region 22 under the tent. The sleeping bag has a wall formed from the thermal protection system 20, and which may include other layers (not shown), which completely surrounds the region 22. At least part of the wall will be in direct contact with the personnel, equipment, or facilities in the region 22.

While preferred embodiments of the present invention are shown and described, it is envisioned that those skilled in the art may devise various modifications of the present invention without departing from the spirit and scope of the appended claims.

What is claimed is:

1. A thermal protection system for protecting a region from a heat source, the thermal protection system comprising:

a first layer comprising a porous flexible refractory textile, the first layer being configured to be directly exposed to the heat source;

a second layer joined to the first layer and comprising a flexible insulator material and/or a flexible intumescent material, the second layer being configured to manage heat absorption through decomposition, phase transformation, charring, and/or sublimation of the second layer in response to heat from the heat source; and a third layer joined to the second layer and configured to be disposed proximate to the region, the third layer comprising a flexible non-porous film, wherein the second layer is disposed between the first layer and the third layer, and wherein the thermal protection system includes no more than one metallic layer and no more than one textile layer.

2. The thermal protection system of claim 1, wherein the porous flexible refractory textile of the first layer comprises refractory fibers or yarns.

3. The thermal protection system of claim 1, wherein the porous flexible refractory textile of the first layer includes refractory ceramic, graphite or glass fibers, tows, and/or yarns.

4. The thermal protection system of claim 1, wherein the second layer comprises an aerogel film.

5. The thermal protection system of claim 1, further comprising a fourth layer joined to the first layer and comprising a flexible material configured to reflect radiation.

6. The thermal protection system of claim 5, wherein the flexible material of the fourth layer comprises metallic films, opacified particulates, and/or photonic deflectors.

7. The thermal protection system of claim 5, wherein the fourth layer is disposed between and joined directly to the first layer and the second layer.

8. The thermal protection system of claim 1, wherein the layers are joined together by adhesives, stitching, needling, tacking, or a combination thereof.

9. The thermal protection system of claim 1, wherein the thermal protection system is formed as a sleeping bag, a tent, a blanket, a vertical barrier, a curtain, a flexible rollup doorway, or a wrap.

10. The thermal protection system of claim 1, wherein the thermal protection system has a thickness of less than 3 mm when the thermal protection system is in a deployed condition.

11. The thermal protection system of claim 10, wherein the thermal protection system can be compressed from its deployed condition when placed into a portable condition.

12. The thermal protection system of claim 1, wherein the first layer is joined directly to a first side of the second layer, and the third layer is joined directly to a second side, opposite the first side, of the second layer.

13. The thermal protection system of claim 1, wherein the first layer is integrally formed with a flexible material configured to reflect radiation.

14. A thermal protection system for protecting a region from a heat source, the thermal protection system comprising:

a first flexible layer formed from a porous textile layer comprised of refractory ceramic, graphite or glass fibers, tows, and/or yarns, the first flexible layer being configured to be directly exposed to the heat source;

a second flexible layer joined to the first flexible layer and formed from one or more insulator materials and/or an intumescent material, the second layer being configured to manage heat absorption through decomposition, phase transformation, charring, and/or sublimation of the second layer in response to heat from the heat source; and a third flexible layer formed from a non-porous film which forms a gas barrier, wherein the thermal protection system includes no more than one metallic layer and no more than one textile layer; and wherein the system is portable and formed as a sleeping bag, a tent, a blanket, a sleeping bag, a vertical barrier, a curtain, a flexible rollup doorway, or a wrap.

15. The thermal protection system of claim 14, further comprising a fourth layer joined to the first layer and comprising a flexible material configured to reflect radiation.

16. The thermal protection system of claim 15, wherein the flexible material of the fourth layer comprises metallic films, opacified particulates, and/or photonic deflectors.

17. The thermal protection system of claim 14, wherein the layers are joined together by at least one of adhesives, stitching, needling, or tacking.

18. A thermal protection system comprising:

a first layer of insulating material; and an inflatable layer joined to the first layer and configured to inflate, the inflatable layer including a plurality of pairs of heat-resistant non-porous films, wherein the heat-resistant non-porous films are joined together at a plurality of seams to form a plurality of inflatable regions, wherein the thermal protection system includes no more than one metallic layer and no more than one textile layer, further comprising a second layer of insulating material joined to the first layer, the insulating material of the second layer being different than the insulating material of the first layer.

19. The thermal protection system of claim 18, wherein:

each of the non-porous films has a central portion and opposite portions on opposite sides of the central portion;

each of the pairs of the non-porous films includes first and second non-porous films that are joined along the opposite portions;

the central portions of the first and second non-porous films are spaced-apart, and the central portion of at least one of the first and second non-porous films of each of the pairs of non-porous films is joined to a central portion of a non-porous film of an adjacent pair of non-porous films.

* * * * *